(12) United States Patent
Gill

(10) Patent No.: US 6,886,807 B1
(45) Date of Patent: May 3, 2005

(54) BITE VALVE FOR DRINKING WITH INTEGRAL SPRING

(76) Inventor: Yoram Gill, 71a Horey Street, Haifa (IL), 34344

( * ) Notice: Subject to any disclaimer, the term of this patent is extended or adjusted under 35 U.S.C. 154(b) by 48 days.

(21) Appl. No.: 10/215,378

(22) Filed: Aug. 7, 2002

(30) Foreign Application Priority Data

Aug. 8, 2001 (IL) .............................................. 144802

(51) Int. Cl.[7] .............................................. F16K 31/00
(52) U.S. Cl. ........................................ 251/342; 251/347
(58) Field of Search ................................ 251/342, 347, 251/341, 343, 348; 215/11.4; 220/703, 705; 222/518, 175; 224/148.2

(56) References Cited

U.S. PATENT DOCUMENTS

| | | | |
|---|---|---|---|
| 2,803,251 A | * 8/1957 | White | 215/11.4 |
| 3,087,656 A | * 4/1963 | Dougherty | 222/518 |
| 5,699,933 A | 12/1997 | Ho et al. | |
| 5,816,457 A | 10/1998 | Croft | |
| 5,911,406 A | 6/1999 | Winefordner et al. | |
| 6,039,305 A | 3/2000 | Hoskins et al. | |
| 6,409,406 B1 | * 6/2002 | Schwartzman | 401/186 |

* cited by examiner

*Primary Examiner*—Joseph C. Merek
(74) *Attorney, Agent, or Firm*—William H. Dippert; Reed Smith LLP

(57) ABSTRACT

A bite valve for drinking liquids from a hydration system, the bite valve having a hollow deformable impervious body with a receiving opening fluidically connectable to an outlet of the hydration system for receiving liquids and a dispensing opening adapted to selectively dispense received liquids. A resilient piston positioned within the hollow deformable body, the resilient piston having a plug normally blocking the dispensing opening, and a resilient bifurcated member having a longitudinal dimension and a lateral dimension, adapted to shorten its initial longitudinal dimension when lateral force is exerted on its lateral dimension, and regain its initial longitudinal dimension when the lateral forces are not exerted, so when a lateral force is exerted on the resilient bifurcated member the piston is retracted inwardly allowing liquid to flow through the dispensing opening.

2 Claims, 2 Drawing Sheets

BITE VALVE FOR DRINKING WITH INTEGRAL SPRING

FIELD OF THE INVENTION

The present invention relates to bite valves for drinking. More particularly, the present invention relates to a bite valve with an integral spring for drinking liquids from a personal hydration system.

BACKGROUND OF THE INVENTION

People that are involved in physical activities, whether they are for military purposes, sports or recreation purposes, need to drink water during activity. In order to do so, personal liquid containers were developed. Such containers have to be light, durable and flexible so that the athlete, traveler or soldier may carry the container conveniently. Personal containers that are designated for these purposes are know in the art and an example for a flexible container may be seen in U.S. Pat. No. 4,526,298 "Sport Hydration System" filed in 1983 by Boxer et al. This patent discloses a sport hydration system that includes a flexible liquid container or bag, suspended from the shoulder.

In order to maximize the advantage of a container designated for drinking water or other beverage during activity, it is beneficial that the personal container would have a comfortable means for withdrawing the water from the container. Drinking water during activity may be done using a means for withdrawing water without the compulsion to stop the activity. For example, if a container is installed at the rear of a bicycle or anywhere else, and the bicyclist desires to drink without halting his bicycles, a means for withdrawing the water from the container may enable him to do so. U.S. Pat. No. 5,755,368 "Liquid Dispensing Apparatus for Bicyclists and Skaters" filed by Bekkedahl in 1996 discloses a liquid dispensing apparatus that is installed on a bicycle for use by a person operating the bicycle or a liquid dispensing apparatus installed on a person for use by a person operating inline skates.

One of the main drawbacks of hydration systems to be used during physical activity is the valve installed at the opening of the container. The valve has to be very easy to operate in order to open it during activity and it has to be hermetically closed when the user does riot drink.

Mouthpieces having bite valves that are connected to a hose connected to a container and are used for withdrawing liquids from the container are known in the art. An example for a bite valve to be connected to hydration systems is disclosed in U.S. Pat. No. 5,601,207 "Bite Valve Having a Plurality of Slits" filed in 1997 by Paczonay. This bite valve for delivering liquid to the mouth of an individual includes a hollow body portion and a deformable plug connected to the body portion. A plurality of spaced slits are formed in the deformable plug. A portion of the deformable plug between the slits changes shape when the bite valve is subjected to opposed compressive force. This causes the portion of the deformable plug to open and form a plurality of openings allowing liquid flow through the deformable plug. Another valve is disclosed in U.S. Pat. No. 6,070,767 "Personal Hydration System with an Improved Mouthpiece" filed in 1998 by Gardner et al. The mouthpiece includes a neck that is adapted to be mounted on a supply tube to a hydration system and which is joint to a resilient head. The head includes a dispensing face with a pair of lips that define a normally closed slit, through which fluid is dispensed from the mouthpiece, a perimeter and a minimum dimension between opposed points on the perimeter. The bite region extends from the perimeter to the lip-receiving shoulder, which extends from the bite region to the neck. Another bite valve is disclosed in U.S. Pat. No. 6,039,305 "Bite Valve for Hydration Bladder" filed in 1998 by Hoskins et al. This bite valve includes a deformable sleeve and an elongated valve body that is received within the deformable sleeve.

A main disadvantage of the existing bite-valves is that most of them allow relative low flow rate of liquid to pass through the valve when bitten open. The user has to spend valuable time in sucking liquid from the hydration container in order to drink a significant amount of liquid, on the expense of taking a breath. Another disadvantage of the available bite-valve including the inventions mentioned herein as references is that the user needs to bite the valve quite hard in order to open the plug. After a certain number of bites, the flexible material becomes deformed and the valve becomes leak-prone. The leaking problem exists even when the valve is new and operating well. Another disadvantage lies in the fact that in existing bite-valves the biting zone is not properly defined, and thus biting in portions of the valve that are relatively distant from the opening slot fail to establish efficient flow.

There are known mouthpieces in the art in which internal pistons and like elements were introduced in order to provide a better and leakage-proof mouthpiece. An example is disclosed in U.S. Pat. No. 5,699,933 "Valve for a Water Dispenser for Bicyclists" filed in 1996 by Ho et al. The patented valve includes a housing, a resilient member, a slide, a bottom, an O-ring and an inlet connector, wherein the resilient member and the slide are fitted within the housing and the inlet connection is engaged with an outer end of the housing. The button can be pressed by the teeth of a user, so that the internal parts are moved, enabling water to flow through a passage of the inlet connector. Another example is disclosed in U.S. Pat. No. 3,819,151 "Flexible Valve" filed by Kish in 1972. This valve has a flexible body which when squeezed in one area, moves a plunger to open a line. An additional exampled prior art is U.S. Pat. No. 6,039,305 "Bite Valve for Hydration Bladder" filed by Hoskins et al., in 1998. The bite valve for a hydration bladder includes a deformable sleeve and an elongated valve body within the deformable sleeve. Deformation of the sleeve permits fluid flow through an outlet.

Most of the above-mentioned valves are provided with inner parts that either makes the valve cumbersome or do not provide a suffice solution. There is a need to introduce a simple mouthpiece having a bite valve that is leakage proof and in the same time exhibit relatively higher flow rates than the common flow rates that are established using existing mouthpieces.

SUMMARY OF THE INVENTION

It is an object of the present invention to provide a novel and improved bite-valve for drinking that enables the user to drink from a personal hydration system in a relatively high rate of flow.

It is another object of the present invention to provide a novel bite-valve for drinking liquids from hydration systems that enables the user to drink a significant amount of fluid in a convenient manner from the container through the valve without having to halt activity or stop breathing for a long time.

Yet, it is another object of the present invention to provide a novel bite-valve for drinking liquids from hydration systems that that is leak-proof.

Another object of the present invention is to provide a novel bite-valve for drinking liquids from hydration systems limiting the bite portion of the valve to a zone where the bite effectively facilitates better flow.

It is thus provided a bite valve for drinking liquids from a hydration system, said bite valve comprising:

- a hollow deformable impervious body having a receiving opening fluidically connectable to a hydration system outlet for receiving liquids and a dispensing opening adapted to selectively dispense received liquids;
- an integral resilient piston positioned within said hollow deformable body, said integral resilient piston comprising a plug normally blocking said dispensing opening, and a resilient bifurcating member having longitudinal dimension and lateral dimension, adapted to shorten its initial predetermined longitudinal dimension when lateral force is exerted on its lateral dimension, and regain its initial longitudinal dimension when the lateral forces are not exerted,
- whereby when lateral force is exerted on said resilient bifurcating member the piston is retracted inwardly thus allowing liquid to flow through said dispensing opening.

Furthermore, in accordance with a preferred embodiment of the present invention, the receiving opening is circular, allowing the body orientation to be adjusted with respect to the hydration system outlet for comfortable use of the bite-valve.

Furthermore, in accordance with a preferred embodiment of the present invention, the slot is located on an oval surface provided on the body defined by a short dimension and a longer dimension, said oval surface is adapted to be placed in a user's mouth allowing the body to be comfortably deformed by biting.

Furthermore, in accordance with a preferred embodiment of the present invention, said dispensing opening is round having a predetermined diameter.

Furthermore, in accordance with a preferred embodiment of the present invention, said plug is round fitting sealingly in dispensing opening.

Furthermore, in accordance with a preferred embodiment of the present invention, a stem connects said plug to said bifurcating member, defining a predetermined distance between said plug and said bifurcating member.

Furthermore, in accordance with a preferred embodiment of the present invention, said stem is positioned between said two opposite protrusions of said bifurcating member attached on a part connecting the protrusions.

Furthermore, in accordance with a preferred embodiment of the present invention, said hollow body is made of silicone.

Furthermore, in accordance with a preferred embodiment of the present invention, a restraining member is provided inside the body, limiting the biting portion of the valve to a portion near the slot, thus facilitating better performance of the valve.

Furthermore, in accordance with a preferred embodiment of the present invention, the restraining member comprises a rigid member that does not interfere with the liquid passage by providing an opening in it.

Furthermore, in accordance with a preferred embodiment of the present invention, said receiving opening is connected and aligned with a connecting conduit, said connecting conduit is adapted to be connected to a hydration pipe of the hydration system.

Furthermore, in accordance with a preferred embodiment of the present invention, said integral resilient piston is made of acetal.

Furthermore, in accordance with a preferred embodiment of the present invention, there is provided a personal hydration system provided with a bite valve to be placed in a user's mouth so that liquids may be drunk from the system, said personal hydration system comprising:

- a flexible container adapted to receive liquid, said flexible container is provided with a filling opening and a dispensing opening;
- a hollow deformable impervious body having a receiving opening fluidically connectable to a hydration system outlet for receiving liquids and a dispensing opening adapted to selectively dispense received liquids;
- an integral resilient piston positioned within said hollow deformable body, said integral resilient piston comprising a plug normally blocking said dispensing opening, and a resilient bifurcating member having longitudinal dimension and lateral dimension, adapted to shorten its initial predetermined longitudinal dimension when lateral force is exerted on its lateral dimension, and regain its initial longitudinal dimension when the lateral forces are not exerted,
- whereby when lateral force is exerted on said resilient bifurcating member the piston is retracted inwardly thus allowing liquid to flow through said dispensing opening.

DETAILED DESCRIPTION OF THE INVENTION AND FIGURES

The bite valve for drinking liquids from hydration systems of the present invention is adapted to facilitate convenient liquid withdrawing from a personal hydration system. The bite valve is easy to operate so that fluid may be withdrawn from the personal hydration system to which the bite valve of the present invention is connected to, without the compulsion to stop activity. Therefore, the bite valve is designated in many respects to people that are involved in physical activities such as sports and recreation.

Figure 1:
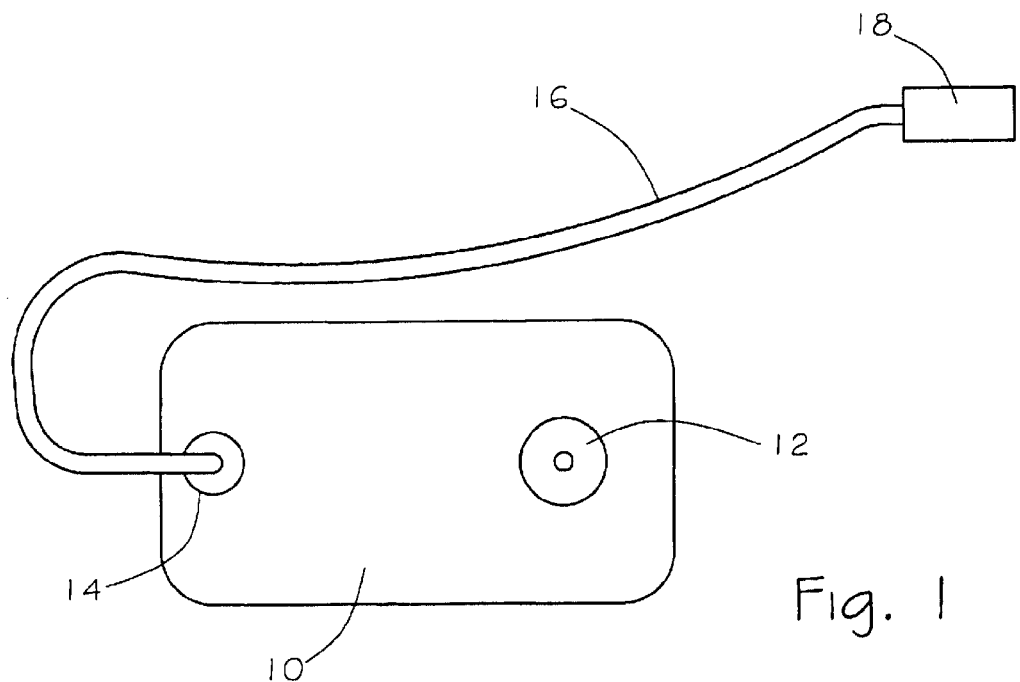
FIG. 1 illustrates a personal hydration container provided with a bite valve for drinking in accordance with the present invention, coupled to the container's hydration pipe.

Reference is made to FIG. 1 illustrating a personal hydration container provided with a bite valve for drinking in accordance with the present invention, coupled to the container's hydration pipe. The personal hydration system of the present invention comprises a container 10 having an opening 12 for receiving liquid and a dispensing opening 14 from which a hydration pipe 16 is extended. Hydration pipe 16 is provided with a bite valve 18 in accordance with a preferred embodiment of the present invention, on which a comprehensive description will be provided herein. A user (nor shown in the Figure) withdraws liquid from container 10 through mouthpiece 18, which is normally closed and opens for withdrawal of liquids when deformation is imposed on the valve. The mouthpiece for drinking liquids from hydration system of the present invention may be coupled to any personal hydration system or bottle having a corresponding opening. For example, the valve may be connected to a container such as the one invented by the inventor of the present invention (Gill Yoram et al.) and disclosed in IL patent no. 119005 "Flexible Liquid Container" filed in 1996, incorporated herein as reference. Mouthpiece 18 is made from a deformable material that regains its original structure upon release of pressure that caused the deformation. Mouthpiece 18 is preferably made of silicone, a durable material that can endure a long-term use in a wide range of temperatures and conditions.

Figure 2:
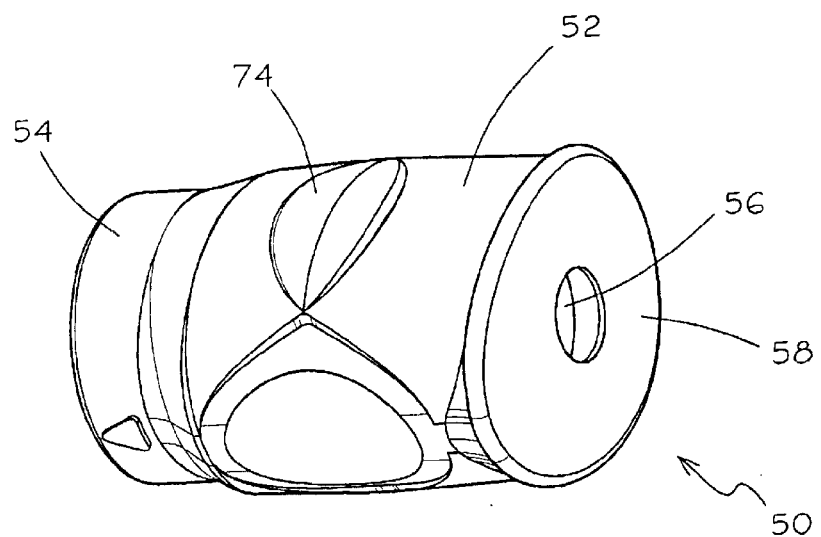
FIG. 2 illustrates an isometric view of a bite valve in accordance with a preferred embodiment of the present invention.
Figure 3A:
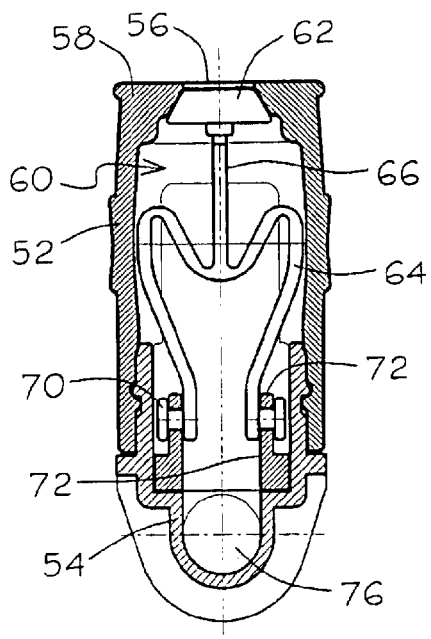
FIG. 3a illustrates a sectioned view of the bite valve shown in FIG. 2, sectioned in the deformation plane. The valve is in a closed position.

Reference is now made to FIG. 2 illustrating an isometric view of a bite valve in accordance with a preferred embodiment of the present invention. The valve is in a closed position. Bite valve 50 comprises a hollow body 52 shaped as a relatively broad basin, which is fluidically communicating with a connecting conduit 54. Connecting conduit 54 is aligned with body 52 and is adapted to be connected to a hydration pipe such as shown in FIG. 1 and to deliver liquid from a container into body 52. Opposite connecting conduit 52, a dispensing opening 56 is provided on a mouth-facing surface 58. Dispensing opening 56 is provided with substantially round perimeter. In order to selectively open or close dispensing opening 56, an internal body having a plug is provided within body 52 (the piston cannot be seen in FIG. 2). Reference is now made to FIG. 3a illustrating a sectioned view of the bite valve shown in FIG. 2, sectioned in the deformation plane. The valve is in a closed position. Piston 60 comprises a plug 62 and a resilient member 64 preferably made of acetal, connected by a stem 66. Piston 60 acts as an integral spring; the connection between plug 62 and resilient member 64 causes the two parts to act as a whole—when one of the parts is deformed, the other reacts. Plug 62 is normally positioned within dispensing opening 56 and is adapted to hermetically close opening 56. A wall that defines dispensing opening 56 is outwardly descending from mouth-facing surface 58 to the internal surface of body 52. Plug 62 is provided with a profile that is adapted to contiguously reside within dispensing opening 58 so as to establish a leakage-proof opening (in the closed position). Resilient member 64 is positioned in a predetermined distance from plug 62 and is provided with a bifurcated protrusion 68 that is normally adjacent to opposite points on the internal circumference of hollow body 52. Stem 66 is concentric to bifurcated protrusion 68 as well as to plug 62. Opposite protruded flanges 70 are provided on resilient member 64, beneath bifurcated protrusions 68, on a base-like area of piston 60. Flanges 70 are adapted to be held by two opposite corresponding securing means 72 that are attached close to connecting conduit 54 and secures piston 60 in place.

Figure 3B:
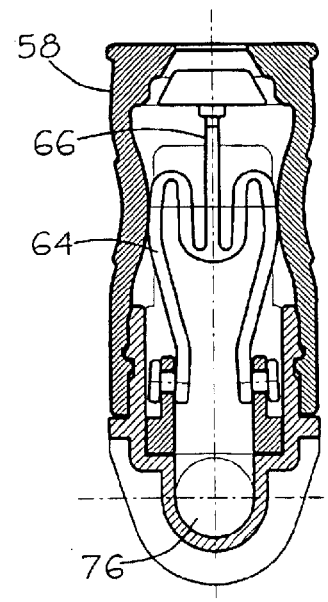
FIG. 3b illustrates a sectioned view of the bite valve shown in FIG. 2, sectioned in the deformation plane. The valve is in an open position.

Reference is now made to FIG. 3b illustrating a sectioned view of the bite valve shown in FIG. 2, sectioned in the deformation plane. The valve is in an open position. Both hollow body 62 and resilient member 64 are deformable bodies, both made from a material that may be deformed under stress and regains its original shape upon removal of the stress. When body 52 is held in a user's mouth and the user imposes an inwardly directed pressure with his teeth on hollow body 52, the wall of the body is pressed internally. The force by the teeth bite is imposed also on the internally accommodated piston 60. Bifurcated protrusion 68 is pressed from both sides so that the protrusions are advancing inwardly toward each other. The deformation of resilient member 64 causes stem 66 to be pressed towards the base of piston 60 and to inwardly pull plug 62 from dispensing opening 56. Upon the release of dispensing opening 56, the user may withdraw liquid from the connected hydration pipe through bite valve 50. In the open position, liquid may communicate between dispensing opening 56 and connecting conduit 54.

Figure 4:
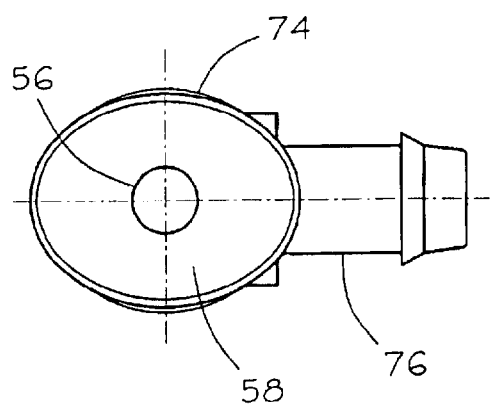
FIG. 4 illustrates a top view of the bite valve shown in FIG. 2.

Reference is now made to FIG. 4 illustrating a top view of the bite valve shown in FIG. 2. Mouth-facing surface 58 is clearly shown. Surface 58 is elliptic shaped so as to correspond a mouth shape and to assure a convenient use of bite valve 50. Surface 58 has a shorter dimension and a longer dimension. Dispensing opening 56 is substantially round opening positioned substantially in the center of surface 58. Bifurcated protrusion is oriented to be parallel to the shorter dimension of surface 58. In this way, when bite valve 50 is placed within the user's mouth, the bifurcated protrusions is oriented to be placed with the protrusions directed towards the bite direction. It is the natural placement of the bite valve in the mouth.

Returning to FIG. 2 illustrating the isometric view of the bite valve of the present invention. Two opposite protrusions 74 are provided on the outer surface of hollow body 52 so as to facilitate the user to bite the protrusions since bifurcated protrusions are oriented to be placed adjacent to the protrusions.

Figure 5:
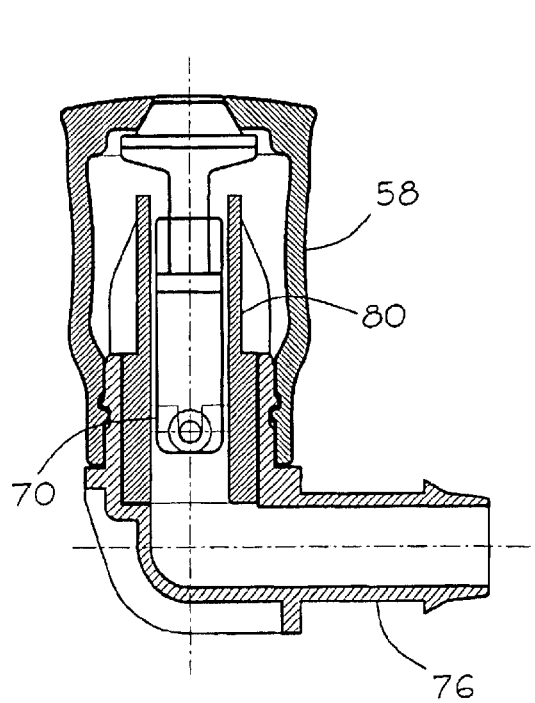
FIG. 5 illustrates a sectioned view of the bite valve shown in FIG. 2, sectioned perpendicular to the deformation plane. The valve is in a closed position.

Reference is now made to FIG. 5 illustrating a sectioned view of the bite valve shown in FIG. 2, sectioned perpendicular to the deformation plane. The valve is in a closed position. A side view of bifurcated protrusions 68 is shown in this figure. It may be seen that liquid may communicate between connecting conduit 54 that may preferably be connected to another angular connector 76 and the inner space of hollow body 52. When plug 62 is descending and dispensing opening 56 is open, opening 56 may be communicating with the hollow basin of body 52 and therefore with hydration pipe (cannot be seen in FIG. 5, shown in FIG. 1). Bifurcated protrusion 68 is being pushes from opposite direction using the teeth of the user, many times in a delicate manner. This may cause a breakage of the bifurcated part. In order to prevent bifurcated protrusions 68 from forcibly moving too much towards each other, two opposite limiting walls 80 are presented and coupled to the interior of body 52. Two opposite limiting walls 80 prevents the protrusions from advancing toward each other to an undesired extent.

It should be clear that the description of the embodiments and attached Figures set forth in this specification serves only for a better understanding of the invention, without limiting its scope as covered by the following claims.

It should also be clear that a person skilled in the art, after reading the present specification could make adjustments or amendments to the attached figures and above described embodiments that would still be covered by the following claims.

What is claimed is:

1. A bite valve for drinking liquids from a hydration system, said bite valve comprising:

a hollow deformable impervious body having a receiving opening fluidically connectable to an outlet of the hydration system for receiving liquids and a dispensing opening adapted to selectively dispense received liquids;

a resilient piston positioned within said hollow deformable body, said resilient piston comprising a plug normally blocking said dispensing opening, and a resilient bifurcated member having longitudinal dimension and lateral dimension, adapted to shorten its initial predetermined longitudinal dimension when a lateral force is exerted on its lateral dimension, and regain its initial longitudinal dimension when the lateral force is not exerted;

a restraining member is provided inside the body, limiting the biting portion of the valve to a portion near the dispensing opening, thus facilitating better performance of the valve, whereby when a lateral force is exerted on said resilient bifurcated member the piston is retracted inwardly thus allowing liquid to flow through said dispensing opening.

2. A bite-valve as claimed in claim 1, wherein the restraining member comprises a rigid member that does not interfere with the liquid passage by providing an opening in it.

* * * * *